US012767248B2

(12) United States Patent
Wei et al.

(10) Patent No.: US 12,767,248 B2
(45) Date of Patent: Oct. 20, 2026

(54) MULTI-MODE SWITCHABLE CAR

(71) Applicant: DONGGUAN AGILEX ROBOTICS CO., LTD., Dongguan (CN)

(72) Inventors: Jidong Wei, Shenzhen (CN); Lei Pei, Shenzhen (CN); Jiyuan Ao, Shenzhen (CN); Zhu Tan, Shenzhen (CN); Runjie Lin, Shenzhen (CN); Keying Wei, Shenzhen (CN); Haochen Yao, Shenzhen (CN)

(73) Assignee: DONGGUAN AGILEX ROBOTICS CO., LTD., Dongguan (CN)

( * ) Notice: Subject to any disclaimer, the term of this patent is extended or adjusted under 35 U.S.C. 154(b) by 648 days.

(21) Appl. No.: 18/248,610

(22) PCT Filed: Sep. 3, 2021

(86) PCT No.: PCT/CN2021/116507

§ 371 (c)(1),
(2) Date: Apr. 12, 2023

(87) PCT Pub. No.: WO2023/004931

PCT Pub. Date: Feb. 2, 2023

(65) Prior Publication Data

US 2023/0271655 A1 Aug. 31, 2023

(30) Foreign Application Priority Data

Jul. 29, 2021 (CN) ......................... 202110862352.8

(51) Int. Cl.
*B62K 25/30* (2006.01)
*B62D 11/04* (2006.01)
(Continued)

(52) U.S. Cl.
CPC .............. *B62D 55/04* (2013.01); *B62D 11/04* (2013.01)

(58) Field of Classification Search
CPC .......... B60K 2007/0038; B60K 7/0007; B60B 19/12; B60B 19/003; B60B 19/02; B62D 63/02
(Continued)

(56) References Cited

U.S. PATENT DOCUMENTS

2002/0023788 A1* 2/2002 Torrie .................. B62D 55/065 180/9.26
2015/0014952 A1 1/2015 Morikawa
2020/0079448 A1* 3/2020 Chen ...................... B62D 21/10

FOREIGN PATENT DOCUMENTS

CN 102826135 A * 12/2012 ............. B62D 55/20
CN 203996409 U 12/2014
(Continued)

OTHER PUBLICATIONS

International Search Report and Written Opinion, Chinese Patent Office, Application No. PCT/CN2021/116507, Mar. 3, 2022.
(Continued)

*Primary Examiner* — Vivek D Koppikar
*Assistant Examiner* — Nabin Kumar Sharma
(74) *Attorney, Agent, or Firm* — ScienBiziP, P.C.

(57) ABSTRACT

A multi-mode switchable car includes a car body, a bogie, a wheel assembly, a steering driving module, a steering locking structure and a locking sensing structure. The car body is provided with a control module, and multiple wheel driving programs are preset. The bogie is rotatably connected to the car body. The wheel assembly includes a hub motor connected to the bogie or the car body and a wheel-type component detachably connected to the hub motor, wheel forms are switchable by connecting different wheel-type components to the hub motor. The steering driving module drives the bogie. The steering locking structure locks the bogie when located in a locking position. The locking sensing structure acquires a position of the steering
(Continued)

locking structure and is electrically connected with the control module, and the control module switches the wheel driving programs according to position information acquired by the locking sensing structure.

1 Claim, 8 Drawing Sheets

(51) Int. Cl.

| | |
|---|---|
| ***B62D 55/04*** | (2006.01) |
| ***B62K 3/02*** | (2006.01) |
| ***B62K 25/04*** | (2006.01) |

(58) Field of Classification Search
USPC .......................................................... 180/7.1
See application file for complete search history.

(56) References Cited

FOREIGN PATENT DOCUMENTS

| | | | | | |
|---|---|---|---|---|---|
| CN | 207578424 U | * | 7/2018 | | B25J 11/00 |
| CN | 110901759 A | | 3/2020 | | |
| CN | 210391301 U | | 4/2020 | | |
| CN | 211699471 U | | 10/2020 | | |
| CN | 211843975 | | 11/2020 | | |
| CN | 211843975 U | * | 11/2020 | | B60B 7/00 |
| CN | 112046604 | | 12/2020 | | |
| CN | 112046604 A | * | 12/2020 | | B60L 15/20 |
| CN | 112051846 A | | 12/2020 | | |
| CN | 212401341 U | | 1/2021 | | |
| CN | 112829855 | | 5/2021 | | |
| CN | 112829855 A | * | 5/2021 | | B62D 11/04 |
| CN | 213168290 U | | 5/2021 | | |
| DE | 102011017335 A1 | | 10/2012 | | |
| JP | 09164971 A | | 6/1997 | | |
| JP | 2011235800 | | 11/2011 | | |
| KR | 1020130074142 | | 7/2013 | | |

OTHER PUBLICATIONS

Office Action for Chinese patent application 2021108623528, Chinese Patent Office, mailed Oct. 8, 2022, 3 pages.

* cited by examiner

MULTI-MODE SWITCHABLE CAR

CROSS-REFERENCE TO RELATED APPLICATIONS

This application is a national stage filing under 35 U.S.C. § 371 of international application number PCT/CN2021/116507, filed Sep. 3, 2021, which claims priority to Chinese patent application No. 2021108623528 filed Jul. 23, 2021. The contents of these applications are incorporated herein by reference in their entirety.

TECHNICAL FIELD

The disclosure relates to the technical field of ROS educational cars, and particularly to a multi-mode switchable car.

BACKGROUND

At present, there are many types of ROS (Robot Operating System) educational cars on the market. According to different wheel forms that are used, there are cars with ordinary wheels, cars with Mecanum wheels, and the like. According to different steering modes that are used, there are Ackerman steering mode, Mecanum four-wheel differential mode, and the like. Moreover, there is often a high degree of correlation between the wheel form that is used and the steering mode that is used. For example, the car with Mecanum wheels needs to be steered by the Mecanum four-wheel differential mode. Once these cars are produced and manufactured, the wheel forms and the steering modes of these cars are usually fixed, so that a single car has a single playing method. However, in order to experience different playing methods and control forms of these cars, each type of car needs to be purchased, resulting in high costs.

In order to solve the above problems, in the related art, components, such as a wheel assembly and a steering structural component, form one integral module in structure. For example, an Ackerman steering structure, corresponding wheels and other components form one integral module, and the Mecanum wheels and corresponding components form another integral module, all of which are detachably mounted on a car body. When the wheel form needs to be changed, one of the integral modules is replaced by another integral module. Although this method solves the above problems to a certain extent, the number of components to be replaced in a switching process is large, resulting in relatively high costs. Moreover, power supply and control circuits of a driving component need to be re-arranged after switching, so that the power supply and control circuits, and the like can all be matched with corresponding wheel form and steering mode, resulting in a very complicated switching process.

SUMMARY

The disclosure aims to solve at least one of the technical problems in the existing technology. Therefore, the disclosure provides a multi-mode switchable car, in which car modes can be switched based on a single car body, and a switching operation is convenient and fast.

A multi-mode switchable car according to an embodiment of the disclosure includes a car body, a bogie, a wheel assembly, a steering driving module, and a steering locking structure; the car body is internally provided with a control module; two bogies are provided and are rotatably connected to two sides of the car body respectively; the wheel assembly includes a hub motor and a wheel-type component, the hub motor is connected to the bogie or the car body, the wheel-type component is detachably connected to the hub motor, at least two types of wheel-type components are provided, wheel forms are switchable by connecting different wheel-type components to the hub motor, and the hub motor is electrically connected with the control module; the steering driving module is arranged on the car body and is configured for driving the bogies to rotate; the steering locking structure is movable between an initial position and a locking position and is capable of locking the bogies when the steering locking structure is located in the locking position.

The multi-mode switchable car according to the embodiment of the disclosure has at least the following beneficial effects.

Since the car is provided with the bogies rotatably connected to the car body and the steering driving module configured for driving the bogies to rotate, when the bogies are in an unlocked state, the car may be structurally switched to form a car of an Ackermann steering mode by connecting the wheel-type component capable of adapting to an Ackermann steering mode to the hub motor; and when the bogies are in the unlocked state, the car may be structurally switched to a car of a four-wheel differential type by connecting the wheel-type component capable of adapting to a four-wheel differential steering mode to the hub motor. Therefore, an overall structural mode of the whole car may be changed only by adjusting the position of the steering locking structure and replacing the wheel-type component, which not only needs fewer components to be replaced, but also avoids re-arranging control and power supply circuits, so that a switching process is simpler, and costs of the car are lower at the same time.

In the multi-mode switchable car according to some embodiments of the disclosure, the wheel-type component at least includes a tire-type component or a Mecanum wheel-type component.

In the multi-mode switchable car according to some embodiments of the disclosure, the tire-type component includes a hub cover and a rubber wheel sleeve, an annular deformation cavity is formed within the rubber wheel sleeve, a first limiting ring and a second limiting ring are formed on two side edges of an opening of the deformation cavity, a third limiting ring is arranged on one side of the hub motor facing the car body, and the hub cover is capable of being detachably connected to one side of the hub motor far away from the car body; and when the tire-type component is connected to the hub motor, the first limiting ring and the second limiting ring are located between the hub cover and the third limiting ring, the third limiting ring abuts against the first limiting ring to limit the rubber wheel sleeve from moving to one side close to the car body, and the hub cover abuts against the second limiting ring to limit the rubber wheel sleeve from moving to one side far away from the car body.

The multi-mode switchable car according to some embodiments of the disclosure further includes a crawler belt, wherein a connecting groove matched with an outer contour of the rubber wheel sleeve is formed on an inner side of the crawler belt, and the crawler belt is capable of being arranged on two rubber wheel sleeves located on a same side of the car body through the connecting groove.

In the multi-mode switchable car according to some embodiments of the disclosure, the Mecanum wheel-type component includes a hub frame, a plurality of roller shafts and a plurality of roller bodies; a motor accommodating cavity is arranged in a middle portion of the hub frame and is capable of being detachably connected to an outer side of the hub motor through the motor accommodating cavity; and the plurality of roller shafts are connected to an outer peripheral side of the hub frame at a certain angle with an axial direction of the hub frame, and the roller bodies are rotatably connected to the respective roller shafts.

In the multi-mode switchable car according to some embodiments of the disclosure, the steering locking structure includes a pin, one of the car body and the bogie is provided with the pin, the other one of the car body and the bogie is provided with a pin hole for cooperation with the pin, and the pin is inserted into the pin hole when located in the locking position.

In the multi-mode switchable car according to some embodiments of the disclosure, the locking sensing structure is arranged on the bogie or the car body and is inserted in one side of the pin hole far away from the pin.

In the multi-mode switchable car according to some embodiments of the disclosure, the two bogies are connected with each other through a synchronous link to realize synchronous rotation.

In the multi-mode switchable car according to some embodiments of the disclosure, the two bogies are both provided with the steering locking structure, or one of the two bogies is provided with the steering locking structure.

In the multi-mode switchable car according to some embodiments of the disclosure, the steering driving module includes a steering engine, a driving arm and a steering link; one end of the driving arm is connected with the steering engine, and the other end of the driving arm is connected with one end of the steering link; and the other end of the steering link is connected with the bogie.

The multi-mode switchable car according to some embodiments of the disclosure further includes: a locking sensing structure, wherein the car body is internally provided with a control module, the hub motor is electrically connected with the control module; at least two wheel driving programs are preset in the control module, the locking sensing structure is configured for acquiring position information of the steering locking structure and is electrically connected with the control module, and the control module is capable of switching the wheel driving programs according to the position information acquired by the locking sensing structure.

The additional aspects and advantages of the disclosure will be given in part in the following description, and will become apparent in part from the following description, or will be learned through the practice of the disclosure.

BRIEF DESCRIPTION OF THE DRAWINGS

The above and/or additional aspects and advantages of the disclosure will become apparent and easy to understand from the descriptions of the embodiments with reference to the following drawings, wherein.

REFERENCE NUMERALS

Figure 1:
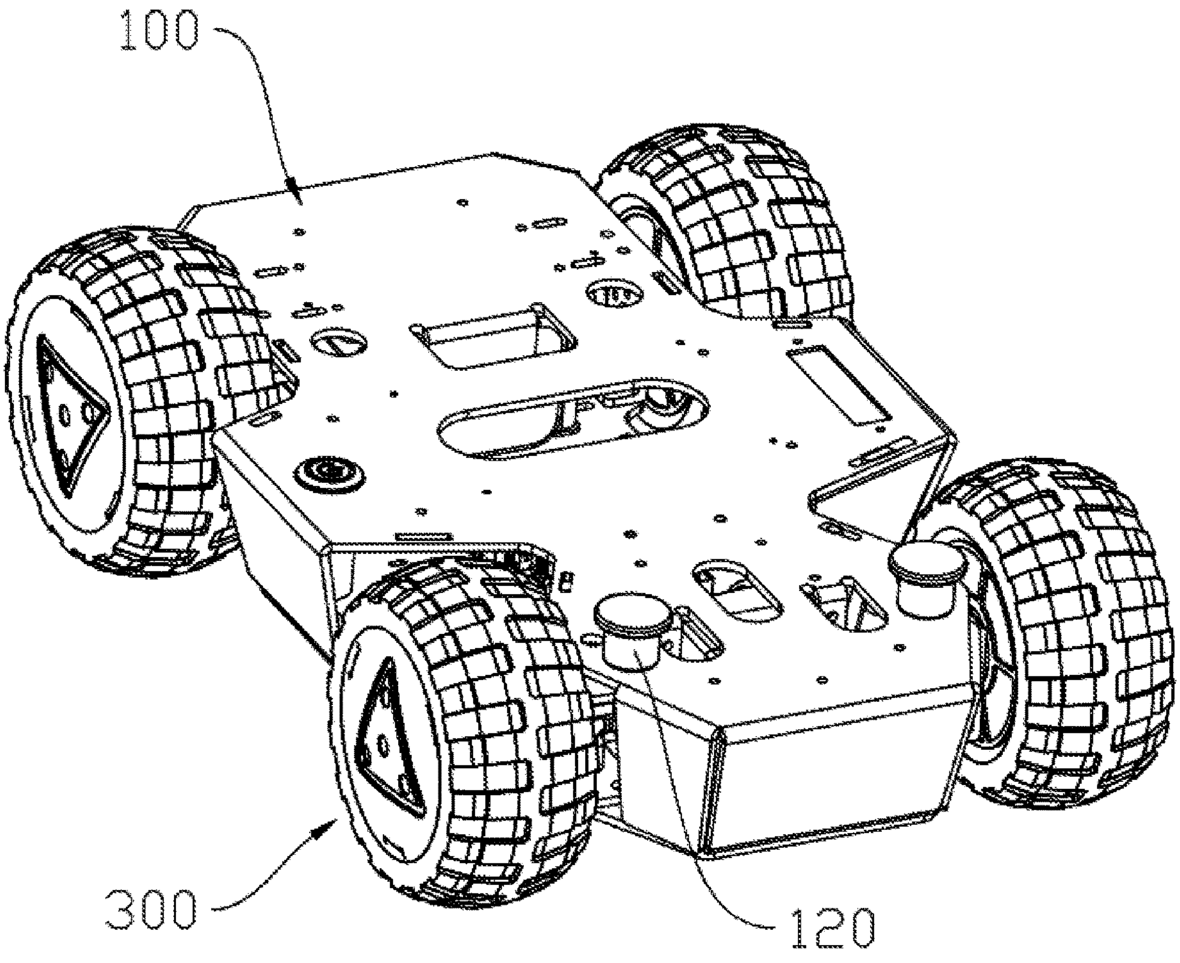
FIG. 1 is a schematic diagram of an overall structure of a multi-mode switchable car in an embodiment of the disclosure in the case that a tire-type component is used.

100 refers to car body, 110 refers to fixed frame, 111 refers to fifth connecting hole, 112 refers to threading hole, and 120 refers to pin;

200 refers to bogie, 210 refers to pin hole, 220 refers to fourth connecting hole, and 230 refers to synchronous link;

300 refers to wheel assembly, 310 refers to hub motor, 311 refers to stator part, 312 refers to sixth connecting hole, 313 refers to rotor part, 314 refers to first connecting hole, 315 refers to third limiting ring, 320 refers to hub cover, 321 refers to second connecting hole, 330 refers to rubber wheel sleeve, 331 refers to deformation cavity, 332 refers to first limiting ring, 333 refers to second limiting ring, 340 refers to crawler belt, 341 refers to connecting groove, 350 refers to hub frame, 351 refers to motor accommodating cavity, 352 refers to third connecting hole, 353 refers to ring table, and 360 refers to roller body;

400 refers to steering driving module, 410 refers to steering engine, 420 refers to driving arm, and 430 refers to steering link; and

500 refers to locking sensing structure.

DETAILED DESCRIPTION

Embodiments of the disclosure will be described in detail hereinafter, and examples of the embodiments are shown in the drawings, wherein the same or similar reference numerals throughout the drawings denote the same or similar elements or elements having the same or similar functions. The embodiments described hereinafter with reference to the drawings are exemplary and are only intended to explain the disclosure, but should not be construed as limiting the disclosure.

In the description of the disclosure, it should be understood that the orientation or position relationships indicated by the terms such as “upper”, “lower”, “left”, “right”, “front”, “rear”, and the like, refer to the orientation or position relationships shown in the drawings, which are only intended to facilitate describing the disclosure and simplifying the description, and do not indicate or imply that the indicated devices or elements must have a specific orientation, be constructed and operated in a specific orientation, and therefore cannot be understood as a limitation of the disclosure.

In the description of the disclosure, if there are descriptions of first and second, it is only for the purpose of distinguishing between technical features, and shall not be understood as indicating or implying relative importance or implying the number of indicated technical features or implying the order of indicated technical features.

In the description of the disclosure, the terms "arrangement", "installation", "connection", and the like should be understood in broad sense unless otherwise specified and defined. The specific meaning of the above terms in the disclosure may be reasonably determined according to specific contents of the technical solutions by those of ordinary skills in the art.

With reference to FIG. 1 to FIG. 11, a multi-mode switchable car according to an embodiment of the disclosure includes a car body 100, a bogie 200, a wheel assembly 300, a steering driving module 400, and a steering locking structure. The car body 100 is internally provided with a control module. Two bogies 200 are provided and are rotatably connected to two sides of the car body 100. The wheel assembly 300 is divided into a first wheel assembly and a second wheel assembly according to different mounting positions, wherein two first wheel assemblies are provided and are connected to the bogies 200, and two second wheel assemblies are provided and are connected to two sides of the car body 100 respectively. Each of the first wheel assembles and each of the second wheel assemblies both include a hub motor 310 and a wheel-type component, the hub motor 310 is connected to the bogie 200 or the car body 100, the wheel-type component is detachably connected to the hub motor 310, at least two types of wheel-type components are provided, wheel forms are switched by connecting different wheel-type components to the hub motor 310, and the hub motor 310 is electrically connected with the control module. The steering driving module 400 is arranged on the car body 100 and is configured for driving the bogies 200 to rotate. The steering locking structure is movable between an initial position and a locking position and is capable of locking the bogies 200 when the steering locking structure is located in the locking position.

It can be understood that, since the car is provided with the bogies 200 rotatably connected to the car body 100 and the steering driving module 400 configured for driving the bogies 200 to rotate, when the bogies 200 are in an unlocked state, the car may be structurally switched to form a car of an Ackermann steering mode by connecting the wheel-type component capable of adapting to the Ackermann steering mode to the hub motor 310; and when the bogies 200 are in the unlocked state, the car may be structurally switched to a car of a four-wheel differential type by connecting the wheel-type component capable of adapting to a four-wheel differential steering mode to the hub motor 310. Therefore, an overall structural mode of the car may be changed only by adjusting the position of the steering locking structure and replacing the wheel-type component, which not only needs fewer components to be replaced, but also avoids re-arranging control and power supply circuits, so that the switching process is simpler, and costs of the car are lower at the same time.

Figure 2:
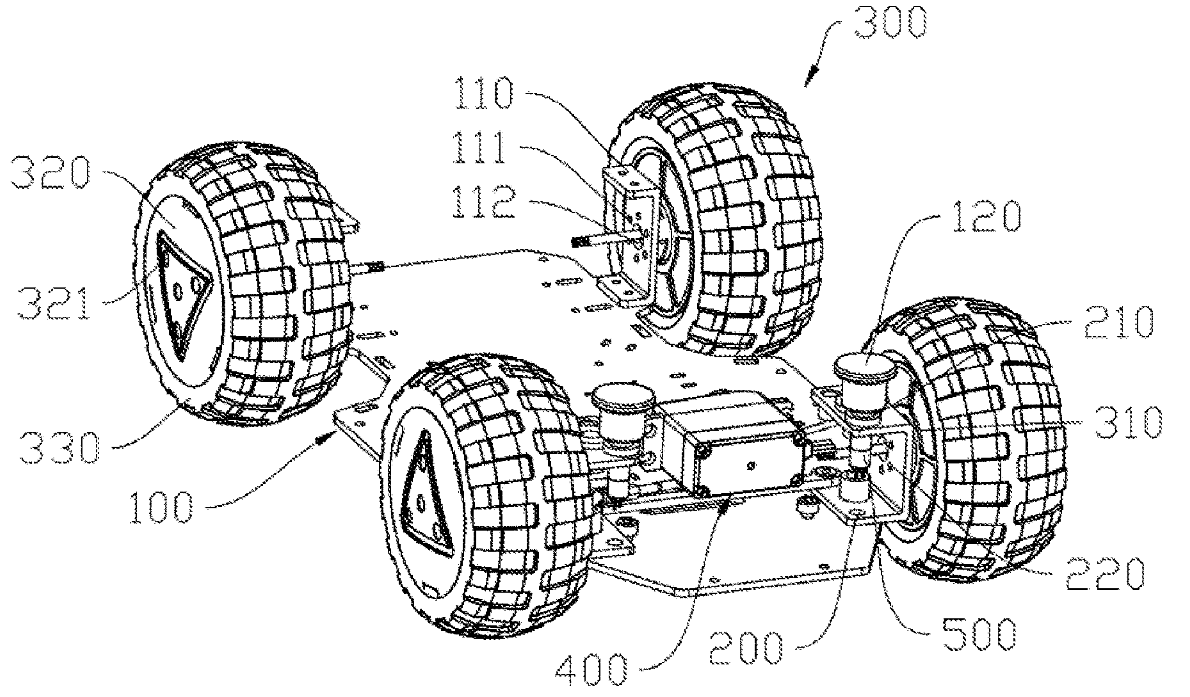
FIG. 2 is a schematic diagram of the multi-mode switchable car shown in FIG. 1 after a top shell and other components of a car body are removed.

With reference to FIG. 2, in this embodiment, the multi-mode switchable car further includes a locking sensing structure 500 for acquiring position information of the steering locking structure, wherein at least two wheel driving programs are preset in the control module, the locking sensing structure 500 is electrically connected with the control module, and the control module is capable of switching the wheel driving programs according to the position information acquired by the locking sensing structure 500.

It can be understood that, since the car is further provided with the locking sensing structure 500 to acquire the position of the steering locking structure, different wheel driving programs are preset in the control module of the car for driving the car of different wheel forms and steering modes, and the control module may switch the wheel driving programs according to the acquired position of the steering locking structure, while the position of the steering locking structure determines whether the bogies 200 are in a locked or unlocked state, which means that the wheel driving programs of the car may be automatically switched along with a change of steering mode, without needing to modify the wheel driving programs artificially.

With reference to FIG. 1 to FIG. 9, it can be understood that, in the embodiment, the wheel-type component includes a tire-type component or a Mecanum wheel-type component. Certainly, there may be other types of wheel-type components in other embodiments. In order to facilitate description, the following part of the embodiment mainly illustrates how the tire-type component and the Mecanum wheel-type component are mounted on a rotor part 313, and how the wheel-type driving of the crawler belt 340 is realized based on the tire-type component. It should be understood that the following description is only exemplary and should not be construed as limiting the disclosure.

Figure 3:
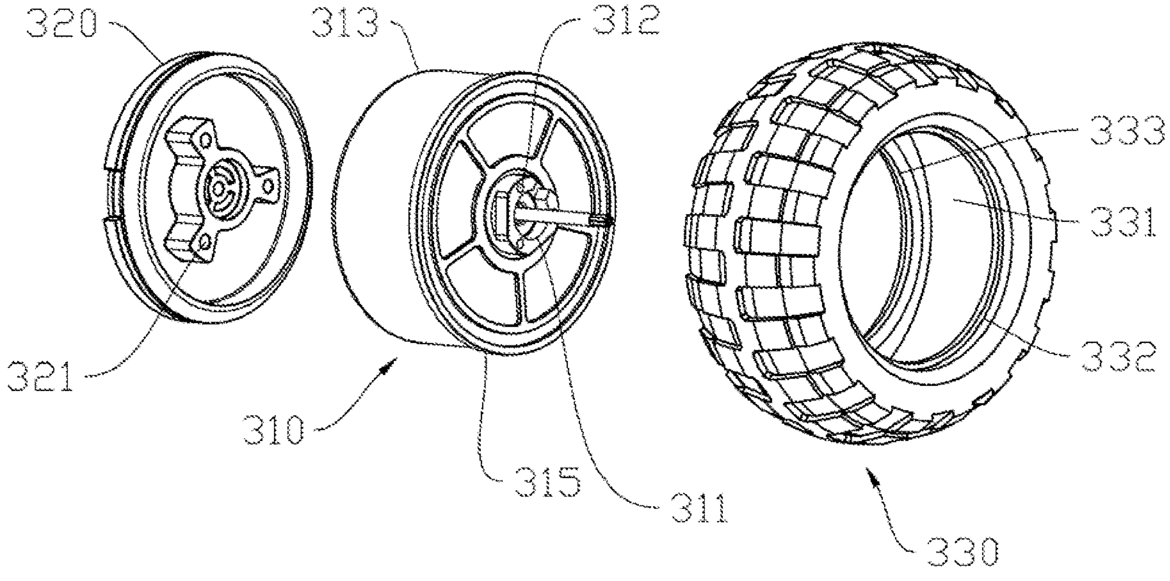
FIG. 3 is a schematic diagram of an exploded structure of a wheel assembly in the embodiment of the disclosure in the case that the tire-type component is used.
Figure 4:
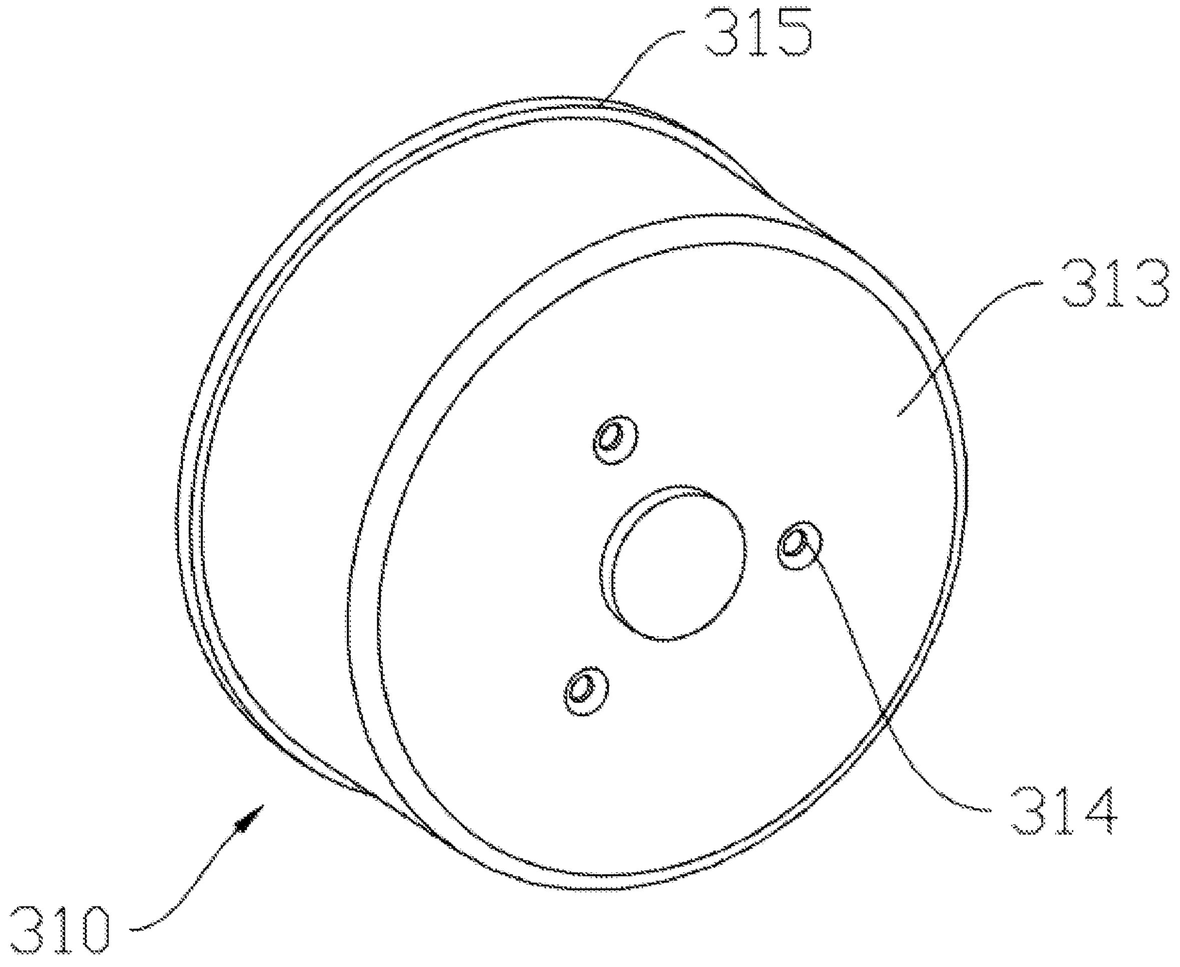
FIG. 4 is a schematic structural diagram of one side of a hub motor far away from the car body in the embodiment of the disclosure.

With reference to FIG. 3 and FIG. 4, it can be understood that the hub motor 310 includes a stator part 311 and the rotor part 313. It can be understood that the stator part 311 is located in a center of the rotor part 313 and is connected with the car body 100, such as being connected to the bogie 200 of the car body 100, or being connected to a fixed frame 110 of the car body 100 which is configured for connection with the motor, or being directly connected to a main body of the car body 100.

With reference to FIG. 3 and FIG. 4, it can be understood that the tire-type component includes a hub cover 320 and a rubber wheel sleeve 330, wherein the hub cover 320 is capable of being detachably connected to one side of the hub motor 310 far away from the car body 100.

Specifically, the hub cover 320 is connected to one side of the rotor part 313 far away from the car body 100. In order to facilitate connection with the wheel-type component, one side of the rotor part 313 far away from the car body 100 is provided with a first connecting hole 314, the hub cover 320 is provided with a second connecting hole 321, and the second connecting hole 321 corresponds to the first connecting hole 314, so that the hub cover 320 is capable of being detachably connected to the rotor part 313 by a screw penetrating through the first connecting hole 314 and the second connecting hole 321, thus being convenient for disassembly and mounting of the hub cover 320.

It can be understood that the rubber wheel sleeve 330 is capable of being arranged around the hub motor 310, which means that the rubber wheel sleeve is arranged around the rotor part 313. An annular deformation cavity 331 is formed within the rubber wheel sleeve 330, and the rubber wheel sleeve 330 is capable of being deformed towards one side close to the hub motor 310 with the aid of the deformation cavity 331, so as to improve a vibration reduction effect. Moreover, the rubber wheel sleeve 330 is provided with a first limiting ring 332 and a second limiting ring 333 formed on two side edges of an opening of the deformation cavity 331, which are configured for limiting an axial position of the rubber wheel sleeve 330, so that the rubber wheel sleeve 330 can always be kept on the hub motor 310, thus being not easy to fall off from the car during running of the car. Specifically, a third limiting ring 315 is arranged at one end of the rotor part 313 close to the car body 100. When the tire-type component is connected to the hub motor 310, the first limiting ring 332 and the second limiting ring 333 are located between the hub cover 320 and the third limiting ring 315, the third limiting ring 315 abuts against the first limiting ring 332 to limit the rubber wheel sleeve 330 from moving to one side close to the car body 100, and the hub cover 320 abuts against the second limiting ring 333 to limit the rubber wheel sleeve 330 from moving to one side far away from the car body 100.

Figure 5:
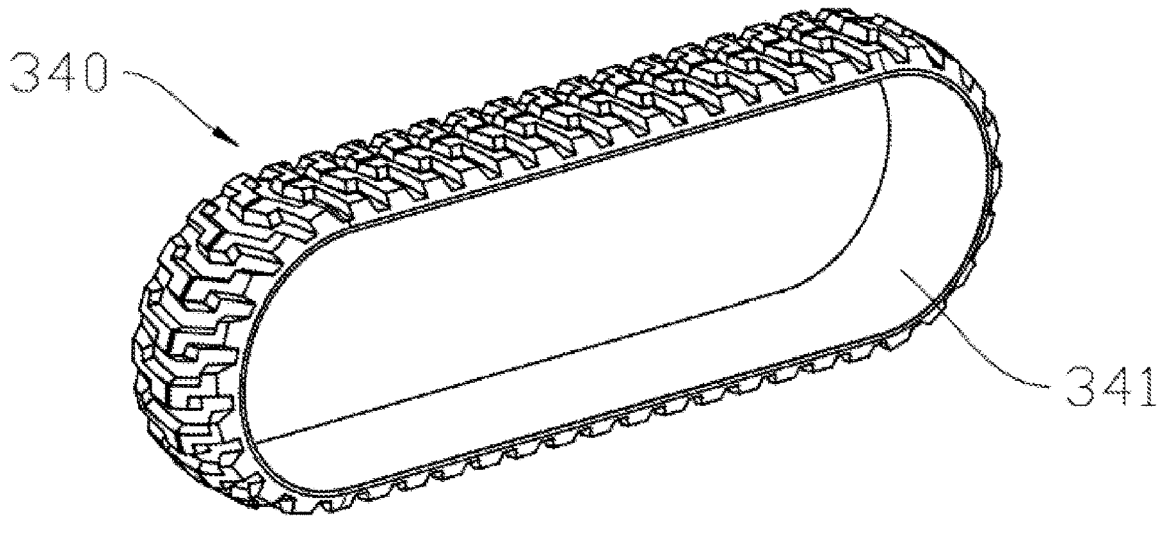
FIG. 5 is a schematic structural diagram of a crawler belt in the embodiment of the disclosure.
Figure 6:
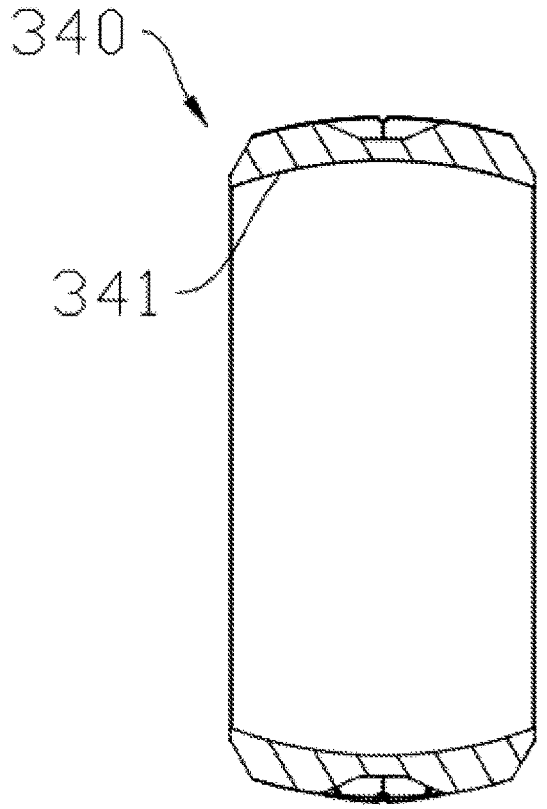
FIG. 6 is a cross-section view of the crawler belt shown in FIG. 5.

With reference to FIG. 5 and FIG. 6, in order to have more wheel forms, in the embodiment of the disclosure, the multi-mode switchable car further includes a crawler belt 340. A connecting groove 341 matched with an outer contour of the rubber wheel sleeve 330 is formed on an inner side of the crawler belt 340, and the crawler belt 340 is capable of being arranged on two rubber wheel sleeves 330 located on a same side of the car body 100 through the connecting groove 341. When the tire-type component and the crawler belt 340 are jointly connected to the hub motor 310, the crawler belt 340 rotates back and forth with the aid of a friction with the rubber wheel sleeve 330 during running of the car, so that the car can also be driven to run by the wheel form of the crawler belt 340.

Figure 7:
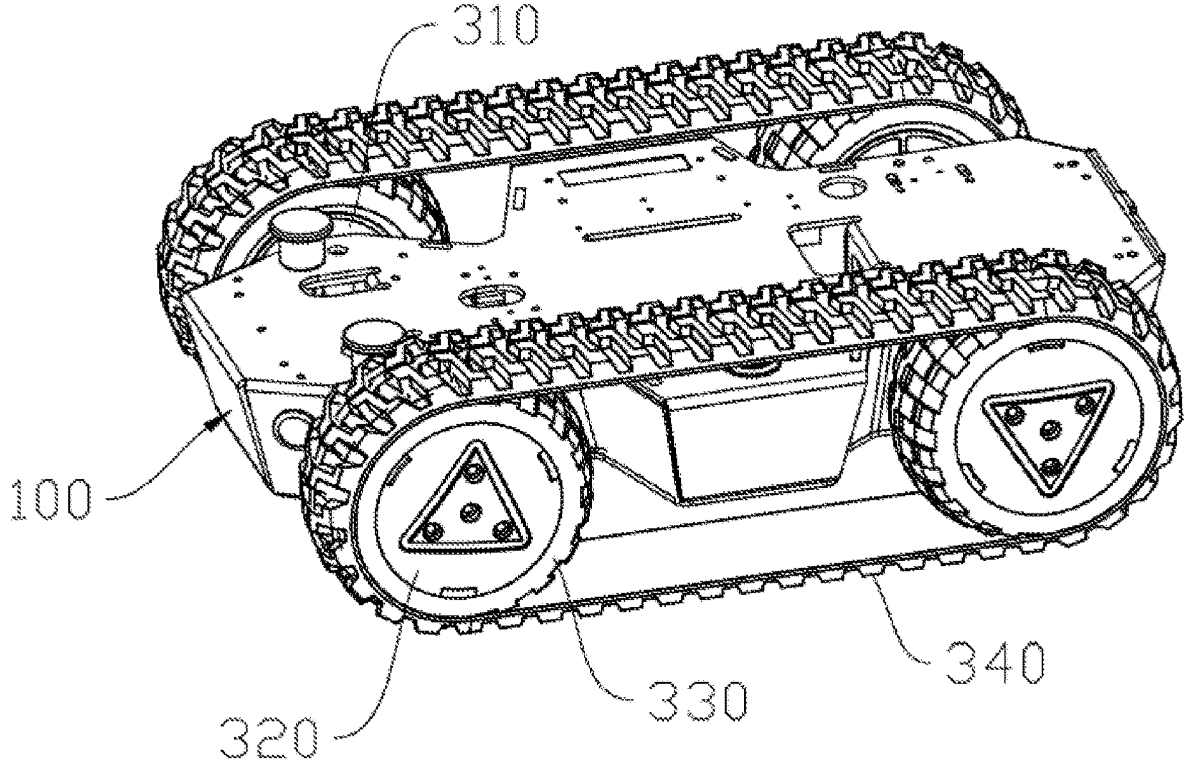
FIG. 7 is a schematic structural diagram of the crawler belt connected to the multi-mode switchable car in the embodiment of the disclosure.
Figure 8:
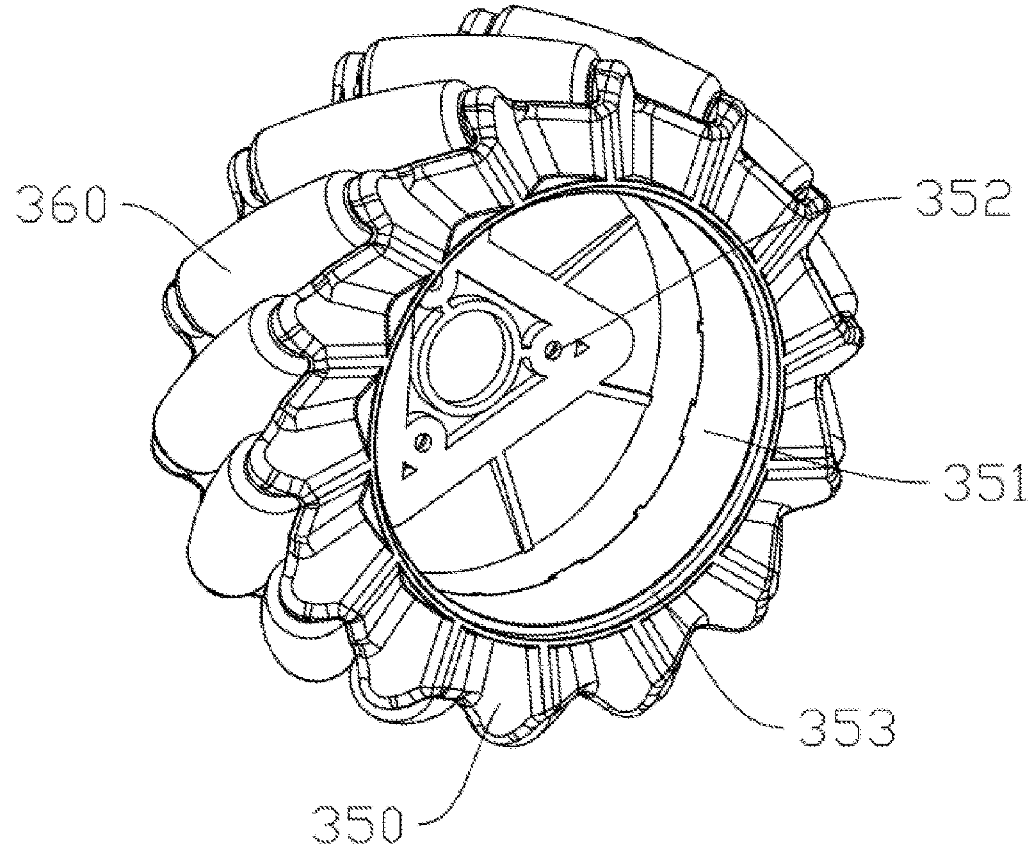
FIG. 8 is a schematic structural diagram of a Mecanum wheel-type component in the embodiment of the disclosure.
Figure 9:
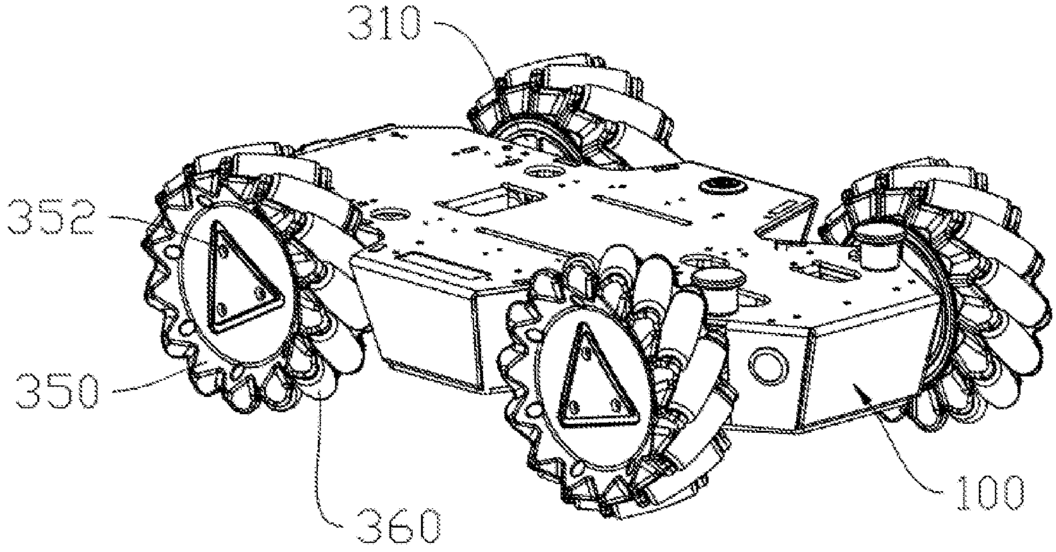
FIG. 9 is a schematic diagram of an overall structure of the multi-mode switchable car in the embodiment of the disclosure in the case that the Mecanum wheel-type component is used.

With reference to FIG. 7 to FIG. 9, it can be understood that the Mecanum wheel-type component includes a hub frame 350, a plurality of roller shafts and a plurality of roller bodies 360. The plurality of roller shafts are connected to an outer peripheral side of the hub frame 350 at a certain angle with an axial direction of the hub frame 350, and the roller bodies 360 are rotatably connected to the respective roller shafts. In order to connect the hub frame 350 to the car body 100, a motor accommodating cavity 351 is arranged in a middle portion of the hub frame 350, and the hub frame 350 is capable of being detachably connected to an outer side of the hub motor 310, which is namely an outer side of the rotor part 313, through the motor accommodating cavity 351.

Moreover, specifically, a bottom of the motor accommodating cavity 351 is provided with a third connecting hole 352, the third connecting hole 352 is arranged corresponding to the first connecting hole 314 in the rotor part 313, and the hub frame 350 is capable of being detachably connected with the rotor part 313 by a screw penetrating through the first connecting hole 314 and the third connecting hole 352, thus being convenient for disassembly and mounting of the hub frame 350. Meanwhile, it is also convenient for transmitting power of the rotor part 313 to the hub frame 350 with the aid of the screw, thus avoiding relative sliding between the rotor part 313 and the hub frame 350 during running of the car. It can be understood that, specifically, an inner wall of the motor accommodating cavity 351 is provided with a ring table 353 at a position close to an opening, and the ring table 353 is configured for being cooperated with and abutting against the third limiting ring 315. With the aid of cooperation between the third limiting ring 315 and the ring table 353, the motor accommodating cavity 351 can be closed, and rain, dust and the like can be prevented from entering the motor accommodating cavity 351 to affect the hub motor 310.

Figure 10:
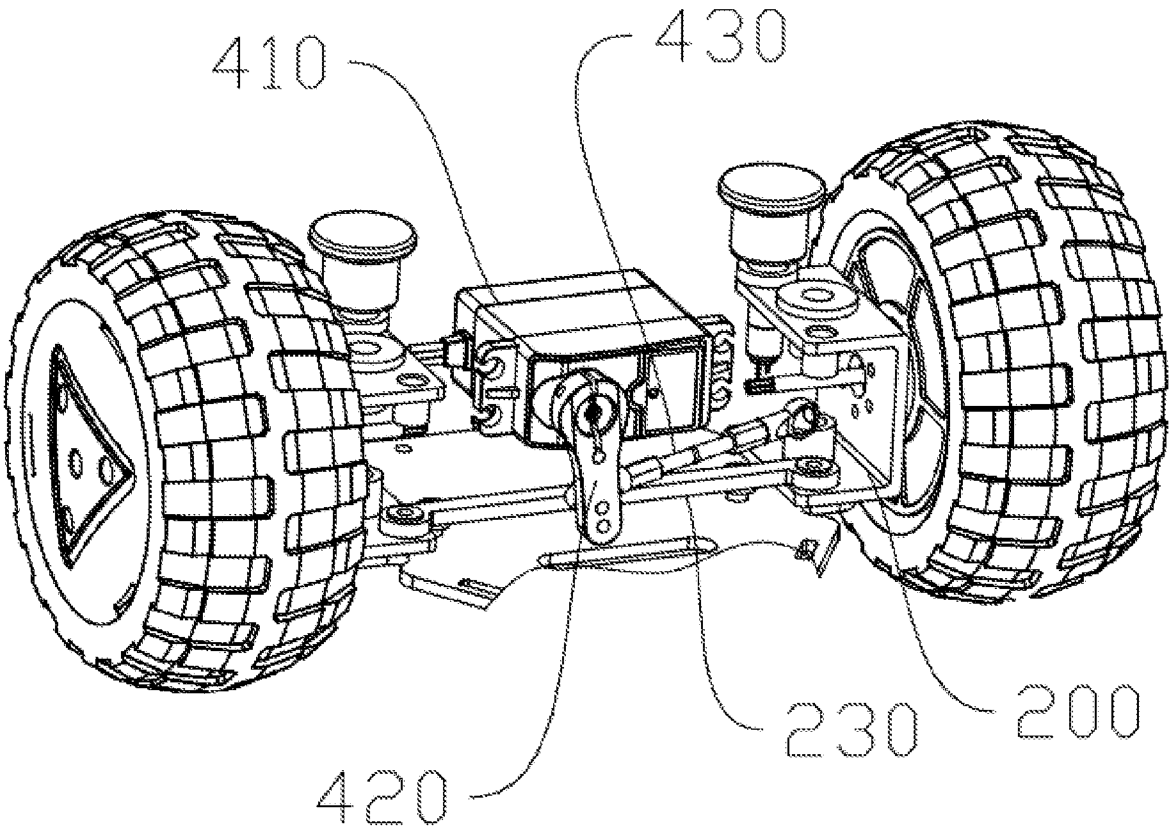
FIG. 10 is a schematic diagram of a connecting structure between a steering driving module and a bogie in the embodiment of the disclosure.

With reference to FIG. 10, it can be understood that, specifically, the steering driving module 400 includes a steering engine 410, a driving arm 420 and a steering link 430. One end of the driving arm 420 is connected with the steering engine 410, and the other end of the driving arm is connected with one end of the steering link 430. The other end of the steering link 430 is connected with the bogie 200. Through the above structure, when the car needs to be steered, the control module of the car may control the steering engine 410 to work, then the driving arm 420 is driven to swing, so as to drive the steering link 430 to move, and then the steering link 430 pulls the bogie 200 to rotate, thus steering the car.

Figure 11:
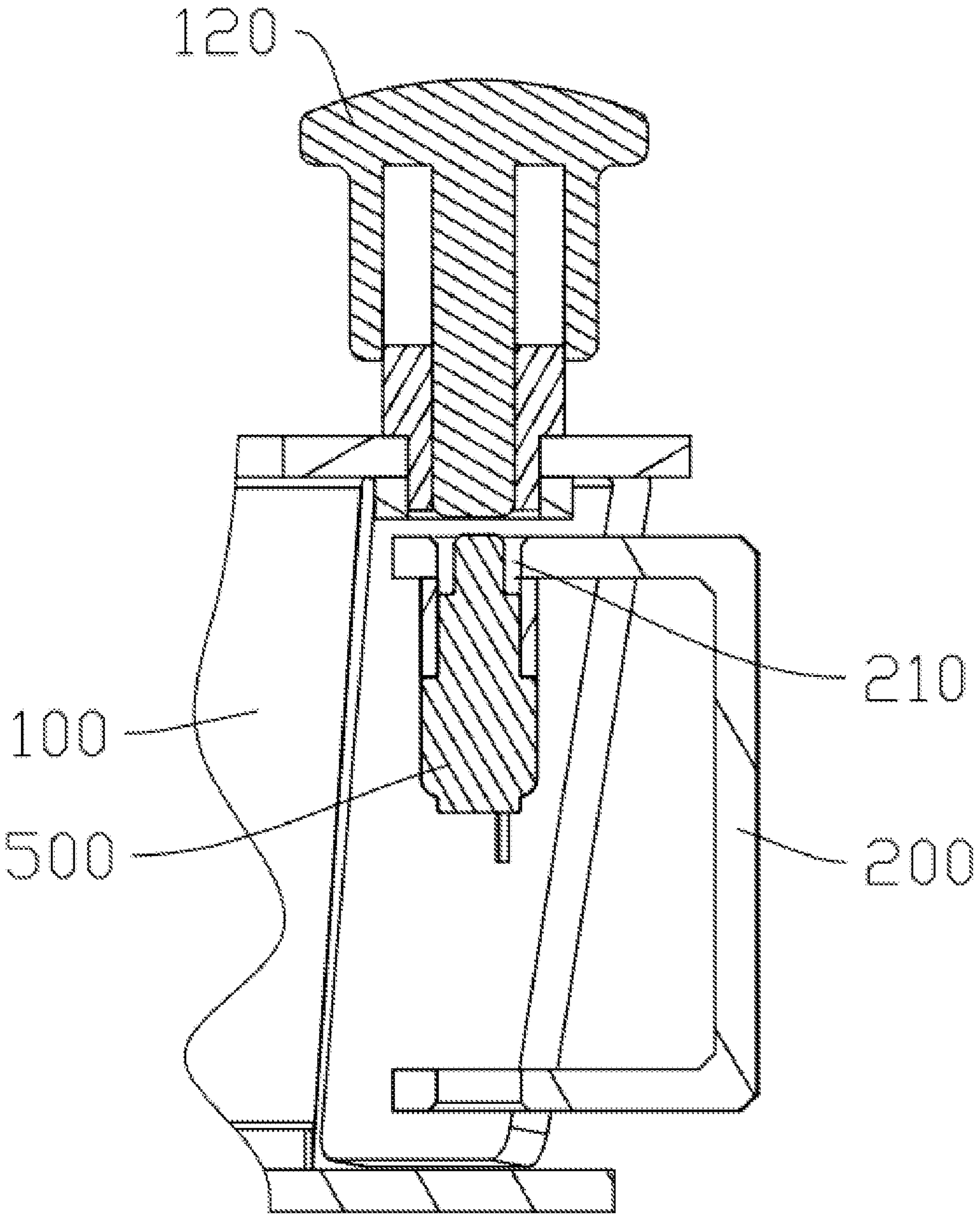
FIG. 11 is a schematic structural diagram of a steering locking structure in which a pin is used to lock the bogie in the embodiment of the application.

With reference to FIG. 11, it can be understood that, in the embodiment, specifically, the steering locking structure includes a pin 120 telescopically arranged on the car body 100, the bogie 200 is provided with a pin hole 210 for cooperation with the pin 120, and the pin 120 is inserted into the pin hole 210 when located in the locking position. Since the bogie 200 is rotatably connected to the car body 100 the rotation of the bogie 200 will be limited after the pin 120 arranged on the car body 100 is inserted into the pin hole 210, so that the bogie 200 is fixed relative to the car body 100. It can be understood that, in other embodiments, alternatively, the pin 120 may be arranged on the bogie 200, and the pin hole 210 for cooperation with the pin 120 is arranged in the car body 100, which can also realize the locking of the bogie 200.

With reference to FIG. 10, it can be understood that, in the embodiment, in order to realize the synchronous rotation of two bogies 200, the two bogies 200 are connected with each other through a synchronous link 230, wherein the steering link 430 of the steering driving module 400 is connected with one of the bogies 200. It can be understood that, since the two bogies 200 are synchronized by connection through the synchronous link 230, arrangement of the steering locking structure on only one of the bogies 200 on a single side can realize the locking of the two bogies 200. With reference to FIG. 1 and FIG. 2, it can be understood that, considering a manufacturing error and other reasons, it is difficult to ensure complete consistency of angles between the two bogies 200 and the axial direction of the car body 100, so that each bogie 200 may also be correspondingly provided with the steering locking structure in some embodiments, thus fixing the two bogies 200 respectively, and further ensuring angular position accuracies of the bogies 200 during fixing.

It can be understood that, according to different driving forms of the pin 120, in some embodiments, the pin 120 may be manually inserted into or pulled out of the pin hole 210. Certainly, in other embodiments, the pin 120 may also be automatically inserted into the pin hole 210 or removed from the pin hole 210 by a locking driver. It can be understood that, specifically, the locking driver may be a linear driver, such as a linear motor or an electromagnetic push rod.

It can be understood that, the locking sensing structure 500 is arranged on the bogie 200 and is inserted in one side of the pin hole 210 far away from the pin 120. The locking sensing structure 500 may be an electronic component, such as an infrared sensing device or a contact switch. When the pin 120 is inserted into the pin hole 210, that is, when the steering locking structure is located in the locking position, the steering locking structure can be sensed by the locking sensing structure 500, and a sensing signal is transmitted to the control module. It can be understood that, in some embodiments, if the pin hole 210 is arranged in the car body 100 and the pin 120 is arranged on the bogie 200, a locking sensing device may be arranged on the car body 100 and inserted in one side of the pin hole 210 far away from the pin 120, which can also realize the sensing of the position of the pin 120.

With reference to FIG. 2, it can be understood that, in order to facilitate the mounting of the second wheel assembly on the car body 100, the car body 100 is provided with the fixed frame 110, two fixed frames 110 are provided and are fixedly connected to two sides of the car body 100, and each fixed frame 110 is provided with one second wheel assembly.

It can be understood that the bogie 200 may be arranged on a front side of the fixed frame 110, so that the first wheel assembly constitutes a front wheel of the car, and the second wheel assembly constitutes a rear wheel of the car, which means that, when the bogie 200 is in an unlocked state, the car employs an Ackerman steering mode of front-wheel steering. Certainly, it can be understood that, in other embodiments, the bogie 200 may also be arranged on a rear side of the fixed frame 110, so that the first wheel assembly constitutes the rear wheel of the car, and the second wheel assembly constitutes the front wheel of the car, which means that, when the bogie 200 is in the unlocked state, the car employs an Ackerman steering mode of rear-wheel steering.

It can be understood that, in order to facilitate the connection of the hub motor 310, the bogie 200 is provided with a fourth connecting hole 220, the fixed frame 110 is provided with a fifth connecting hole 111, and the stator part 311 of the hub motor 310 is provided with a sixth connecting hole 312 corresponding to the fourth connecting hole 220 or the fifth connecting hole 111, thus facilitating the connection of the hub motor 310 to the bogie 200 and the fixed frame 110 by the screw. Moreover, specifically, the bogie 200 and the fixed frame 110 are further provided with a threading hole 112 for threading power supply or control circuits of the hub motor 310.

It can be understood that, in order to adapt to the wheel form and the steering mode of the car, the wheel driving programs may be different. For example, when the tire-type component above is connected to the hub motor 310 and the steering locking structure is located in the initial position, that is, when the car employs the ordinary wheel form and the Ackerman steering mode, one wheel driving program is needed to be matched. In order to facilitate description, this wheel driving program will be called driving mode 1.0. However, when the tire-type component is connected to the hub motor 310 and the steering locking structure is located in the locking position, that is, when the car employs the ordinary wheel form and the ordinary four-wheel differential steering mode, another wheel driving program is needed to be matched. In order to facilitate description, the another wheel driving program may be called driving mode 2.1. However, when the Mecanum wheel-type component is connected to the hub motor 310 and the steering locking structure is located in the locking position, that is, when the car employs the wheel form of Mecanum wheel and the Mecanum four-wheel differential steering mode, a third wheel driving program is needed to be matched. In order to facilitate description, this third wheel driving program will be called driving mode 2.2.

It can be understood that, when the three wheel driving programs above are preset in the control module at the same time, the control module switches the wheel driving programs according to the position information acquired by the locking sensing structure 500, which may include the following situations: when it is sensed that the steering locking structure is changed from the locking position to the initial position, the control module may directly switch the driving mode 2.1 or the driving mode 2.2 to the driving mode 1.0; and when it is sensed that the steering locking structure is changed from the initial position to the locking position, the control module may switch the driving mode 1.0 to a manual selection state of the driving mode to enter the driving mode 2.1 or the driving mode 2.2 by manual selection.

It can be understood that, when only the driving mode 1.0 and the driving mode 2.2 above are preset in the control module, the control module switches the wheel driving programs according to the position information acquired by the locking sensing structure 500, which may include the following situations: when it is sensed that the steering locking structure is changed from the locking position to the initial position, the control module may directly switch the driving mode 2.2 to the driving mode 1.0; and when it is sensed that the steering locking structure is changed from the initial position to the locking position, the control module may directly switch the driving mode 1.0 to the driving mode 2.2.

In the descriptions of the specification, the descriptions with reference to the terms “one embodiment”, “some embodiments”, “illustrative embodiment”, “example”, “specific example” or “some examples”, etc., refer to that specific features, structures, materials, or characteristics described with reference to the embodiments or examples are included in at least one embodiment or example of the disclosure. In the specification, the schematic representation of the above terms does not necessarily mean the same embodiment or example. Moreover, the specific features, structures, materials or characteristics described may be combined in any one or more embodiments or examples in a suitable manner.

Although the embodiments of the disclosure have been shown and described, those of ordinary skills in the art should understand that: various changes, amendments, substitutions and variations can be made to these embodiments without departing from the principles and purposes of the disclosure, and the scope of the disclosure is defined by the claims and equivalents thereof.

What is claimed is:

1. A multi-mode switchable car, comprising:

a car body internally provided with a control module;

two bogies rotatably connected to two sides of the car body respectively;

a wheel assembly comprising a hub motor and a wheel-type component, wherein the hub motor is connected to the bogie or the car body, the wheel-type component is detachably connected to the hub motor, at least two types of wheel-type components are provided, the wheel-type components at least comprise a tire-type component and a Mecanum wheel-type component, the multi-mode switchable car being configured to switch between different wheel configurations by selectively attaching different wheel-type components to the hub motor;

and the hub motor is electrically connected with the control module;

a steering driving module arranged on the car body and configured for driving the bogies to rotate;

a steering locking structure movable between an initial position and a locking position and capable of locking the bogies when the steering locking structure is located in the locking position;

a locking sensing structure, wherein at least two wheel driving programs are preset in the control module, the locking sensing structure is configured for acquiring position information of the steering locking structure and is electrically connected with the control module, and the control module is capable of switching the wheel driving programs according to the position information acquired by the locking sensing structure.

* * * * *